US012372936B2

(12) United States Patent
Shigemori

(10) Patent No.: US 12,372,936 B2
(45) Date of Patent: Jul. 29, 2025

(54) INFORMATION PROVIDING SYSTEM FOR MONITORING VARIABLES OF ONE OR MORE CONTROLLERS, SERVER, AND INFORMATION PROVIDING METHOD

(71) Applicant: OMRON CORPORATION, Kyoto (JP)

(72) Inventor: Yutsuka Shigemori, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 822 days.

(21) Appl. No.: 17/607,316

(22) PCT Filed: Mar. 10, 2020

(86) PCT No.: PCT/JP2020/010279
§ 371 (c)(1),
(2) Date: Oct. 28, 2021

(87) PCT Pub. No.: WO2020/235183
PCT Pub. Date: Nov. 26, 2020

(65) Prior Publication Data
US 2022/0206455 A1    Jun. 30, 2022

(30) Foreign Application Priority Data
May 22, 2019   (JP) .................................. 2019-096136

(51) Int. Cl.
*G06F 9/451*   (2018.01)
*G05B 19/042*   (2006.01)
*G06F 8/38*   (2018.01)
(52) U.S. Cl.
CPC ........... *G05B 19/0426* (2013.01); *G06F 8/38* (2013.01); *G06F 9/451* (2018.02); *G05B 2219/23008* (2013.01)

(58) Field of Classification Search
None
See application file for complete search history.

(56) References Cited

U.S. PATENT DOCUMENTS

2010/0185758 A1   7/2010   Hoga et al.
2014/0115025 A1*  4/2014   Taoka ..................... H04L 67/10
                                                      709/201

(Continued)

FOREIGN PATENT DOCUMENTS

CN          101689118 A       3/2010
CN          104756023 A       7/2015

(Continued)

OTHER PUBLICATIONS

Office Action dated Apr. 29, 2023 from the Chinese Patent Office in Application No. 202080031750.9.

(Continued)

*Primary Examiner* — Rinna Yi
(74) *Attorney, Agent, or Firm* — Sughrue Mion, PLLC

(57) ABSTRACT

For each of one or a plurality of control units, a development support device registers a service corresponding to the control unit and a screen generation code generating a UI screen corresponding to the service in a server. The server includes a service module providing a target service of a target control unit requested by the terminal. The service module accesses the target control unit to collect target data obtained by the target control unit executing the control program; and provides a UI screen, which is indicated by the screen generation code corresponding to the target service and includes the target data, to the terminal. Thus, the one or the plurality of control units can be easily monitored.

11 Claims, 15 Drawing Sheets

(56) References Cited

U.S. PATENT DOCUMENTS

| | | |
|---|---|---|
| 2014/0181787 A1 | 6/2014 | Hristov |
| 2015/0220076 A1 | 8/2015 | Uchida |
| 2016/0004239 A1 | 1/2016 | Furushima |
| 2017/0322989 A1 | 11/2017 | Tran et al. |
| 2019/0196434 A1* | 6/2019 | Fujisawa ............... G06F 30/00 |
| 2019/0244554 A1* | 8/2019 | Tokuchi ............... G06F 3/0304 |
| 2020/0225631 A1 | 7/2020 | Takahashi et al. |

FOREIGN PATENT DOCUMENTS

| | | | |
|---|---|---|---|
| CN | 105074587 | A | 11/2015 |
| EP | 1 752 843 | A2 | 2/2007 |
| EP | 1 752 843 | B1 | 7/2011 |
| JP | 2003-162321 | A | 6/2003 |
| JP | 2004-199486 | A | 7/2004 |
| JP | 2004-213406 | A | 7/2004 |
| JP | 2011-216005 | A | 10/2011 |
| JP | 2011-233112 | A | 11/2011 |
| JP | 5295464 | B1 | 9/2013 |
| JP | 2013-250810 | A | 12/2013 |
| JP | 2018-205897 | A | 12/2018 |
| JP | 2019-003417 | A | 1/2019 |
| JP | 2019-061299 | A | 4/2019 |
| KR | 10-1865343 | B1 | 7/2018 |
| KR | 10-2018-0131819 | A | 12/2018 |
| WO | 2012/056539 | A1 | 5/2012 |
| WO | 2014/181466 | A1 | 11/2014 |
| WO | 2015/045108 | A1 | 4/2015 |
| WO | 2015/170408 | A1 | 11/2015 |

OTHER PUBLICATIONS

Extended European Search Report dated May 17, 2023 in Application No. 20809969.7.
Chinese Office Action dated Sep. 22, 2023 in Application No. 202080031750.9.
International Search Report for PCT/JP2020/010279 dated May 19, 2020 [PCT/ISA/210].
Written Opinion for PCT/JP2020/010279 dated May 19, 2020 [PCT/ISA/237].

* cited by examiner

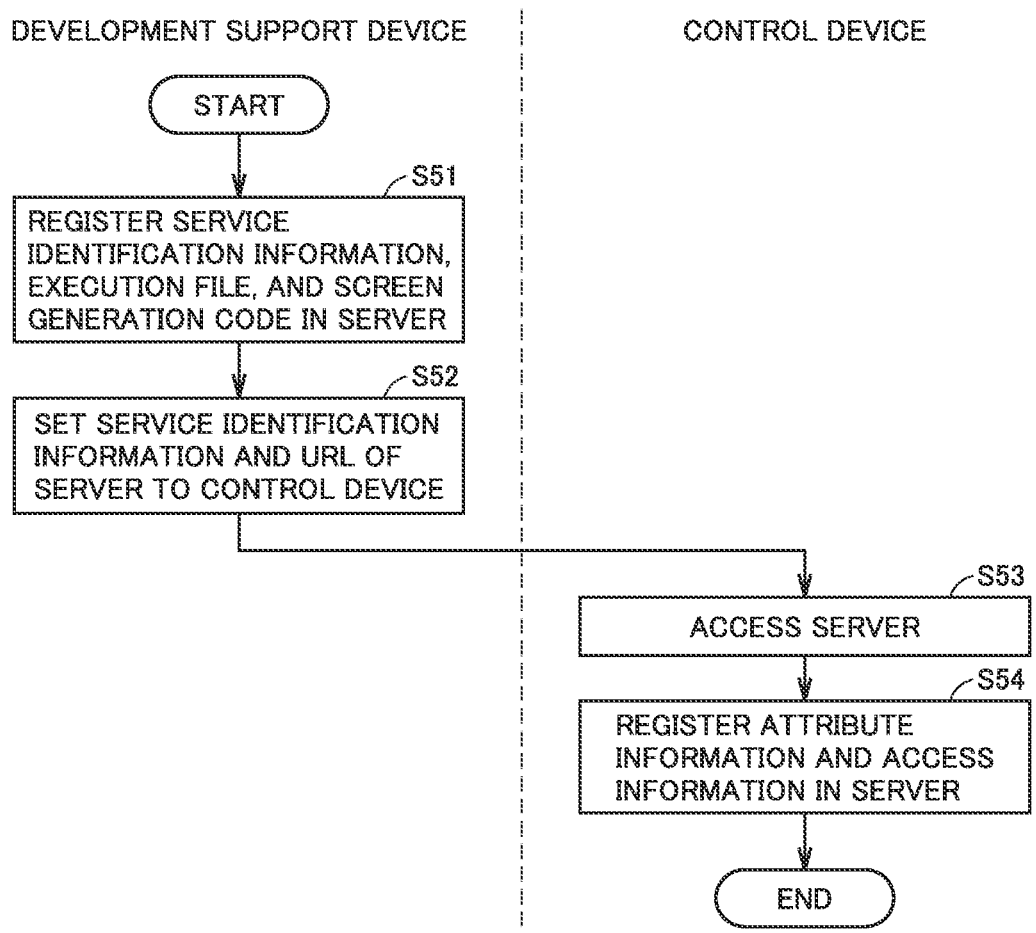

INFORMATION PROVIDING SYSTEM FOR MONITORING VARIABLES OF ONE OR MORE CONTROLLERS, SERVER, AND INFORMATION PROVIDING METHOD

CROSS REFERENCE TO RELATED APPLICATIONS

This application is a National Stage of International Application No. PCT/JP2020/010279 filed Mar. 10, 2020, claiming priority based on Japanese Patent Application No. 2019-096136 filed May 22, 2019, the entire contents of each of which being herein incorporated by reference in their entireties.

TECHNICAL FIELD

The present disclosure relates to an information providing system, a server, and an information providing method.

BACKGROUND ART

Japanese Patent Laying-Open No. 2004-213406 (PTL 1) discloses a remote management system including a factory automation (FA) device controlling machines in a plant or a factory and a network device. The network device is connected to the FA device through a network and monitors the FA device.

CITATION LIST

Patent Literature

PTL 1: Japanese Patent Laying-Open No. 2004-213406

SUMMARY OF INVENTION

Technical Problem

According to the technique described in PTL 1, a plurality of FA devices can be monitored using a network device. However, because a protocol and a command are different for each FA device, it takes time and effort to install previously a monitoring application produced for each FA device in the network device. Furthermore, because information (for example, an IP address) for accessing the FA device needs to be set in the monitoring application, a monitoring person needs to previously check the IP address of each FA device to be monitored.

The present disclosure has been made in view of the above problems, and an object of the present disclosure is to provide an information providing system, a server, and an information providing method capable of easily monitoring one or the plurality of control units.

Solution to Problem

According to one aspect of the present disclosure, an information providing system includes: one or a plurality of control units configured to control a control target; a server capable of communicating with a terminal and the one or the plurality of control units; and a development support device configured to support development of the one or the plurality of control units. The development support device includes a production unit and a registration unit. The production unit is configured to produce a control program to be executed by the control unit for each of the one or the plurality of control units, and output the control program to the control unit. The registration unit is configured to register a service corresponding to the control unit and a screen generation code generating a UI screen corresponding to the service in the server for each of the one or the plurality of control units. The server includes a service module configured to provide a target service of a target control unit requested from the terminal in a plurality of services registered by the registration unit. The service module is configured to access the target control unit to collect target data obtained by the target control unit executing the control program; and provide a UI screen, which is indicated by the screen generation code corresponding to the target service and includes the target data, to the terminal.

According to this disclosure, the monitoring person can easily check the target data obtained by the target control unit by operating the terminal to access the server and requesting the target service of the target control unit. That is, the application for each control unit needs not to be previously installed in the terminal in advance. Furthermore, because the access to the control unit is performed from the server, the monitoring person does not need to previously check information (for example, an IP address) for accessing each control unit. Thus, the one or the plurality of control units can be easily monitored.

In the above disclosure, at least one control unit of the one or the plurality of control units includes a plurality of control devices. The control program for the at least one control unit includes a partial program corresponding to each of the plurality of control devices. The registration unit registers at least one of a first service corresponding to a set of the plurality of control devices and a plurality of second services corresponding to the plurality of control devices in the server as a service corresponding to the at least one control unit.

According to this disclosure, any one of the first service and the plurality of second services corresponding to the plurality of control devices may be registered according to the target data to be monitored.

For example, the registration unit is configured to register at least one second service of the plurality of second services in the server. The target data is obtained by a control device that corresponds to the at least one second service and executes the partial program. Thus, the target data can be monitored in units of control devices.

In the above disclosure, the registration unit is configured to register attribute information about the service in the server in association with the service. The service module is configured to extract a service corresponding to the attribute information indicating an attribute designated by the terminal from the plurality of services, output a list of the extracted services to the terminal, and specify a service designated by the terminal in the list as the target service.

According to this disclosure, the monitoring person can easily select a desired service by specifying the attribute of the service. For example, the attribute information indicates at least one of an installation position of a corresponding control unit in the one or the plurality of control units, a type of the corresponding control unit, an organization to which the corresponding control unit belongs, a name of a control device included in the corresponding control unit, a name of the control program, and a type of the target data.

In the above disclosure, the terminal includes a web browser. The service module is configured to provide the UI screen to the terminal based on an instruction from the web browser. According to this disclosure, the monitoring person can easily monitor the target data using a general-purpose web browser.

According to an example of the present disclosure, a server included in the information providing system includes the service module.

According to an example of the present disclosure, an information providing method in a system including one or a plurality of control units configured to control a control target and a server capable of communicating with a terminal and the one or the plurality of control units includes the following first to third steps. The first step is a step of producing a control program to be executed by the control unit for each of the one or the plurality of control units, and outputting the produced control program to the control unit. The second step is a step of registering a service corresponding to the control unit and a screen generation code generating a UI screen corresponding to the service in the server for each of the one or the plurality of control units. The third step is a step of providing a target service of a target control unit requested from the terminal in a plurality of services registered by the server. The third step includes: a step of accessing the target control unit to collect target data obtained by the target control unit executing the control program; and a step of causing the terminal to display the UI screen that is indicated by the screen generation code corresponding to the target service and includes the target data. According to these disclosures, the one or the plurality of control units can also be easily monitored.

Advantageous Effects of Invention

According to the present disclosure, one or the plurality of control units can be easily monitored.

BRIEF DESCRIPTION OF DRAWINGS

FIG. 17 is a flowchart illustrating an example of registration processing of registration data according to a modification.

DESCRIPTION OF EMBODIMENTS

Figure 1:
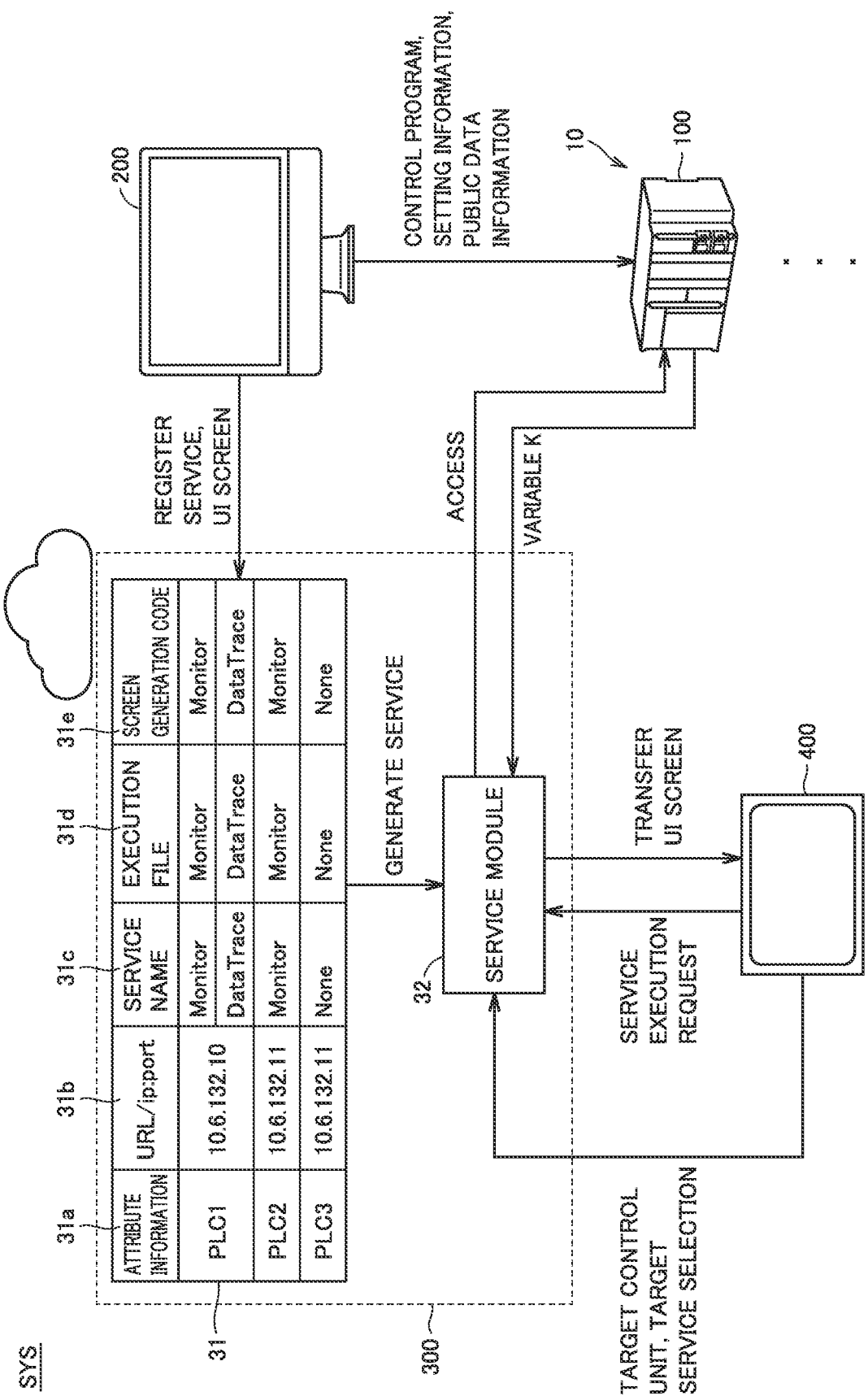
FIG. 1 is a schematic diagram illustrating an overall configuration of an information providing system according to an embodiment.

An embodiment of the present invention will be described in detail with reference to the drawings. The same or equivalent portion in the drawings is denoted by the same reference numeral, and the description will not be repeated.

§ 1 Application Example

With reference to FIG. 1, an example of a scene to which the present invention is applied will be described. FIG. 1 is a schematic diagram illustrating an overall configuration of an information providing system of the embodiment. An information providing system SYS in FIG. 1 provides data (hereinafter referred to as "target data") to a user. One or a plurality of control units 10 controlling a control target executes a control program, thereby obtaining the target data. The control target is installed in a production line, and for example, includes a motor, a robot, a camera, and various sensors.

A type of the target data is not limited. For example, the target data includes a variable indicating a position of the motor that is of the control target and a feature amount detected from an image obtained by imaging of the camera that is the control target.

Information providing system SYS in FIG. 1 includes the one or the plurality of control units 10 that control the control target, a development support device 200, a server 300, and a terminal 400.

Each of the one or the plurality of control units 10 includes one or a plurality of control devices 100. Each of the one or the plurality of control devices 100 is an FA device constituting a network system in factory automation, and for example, is a programmable logic controller (PLC).

The one or the plurality of control devices 100 included in each control unit 10 control a connected control target (not illustrated) by executing the control program. Control device 100 executes the control program, whereby the target data is obtained. In the example of FIG. 1, control device 100 executes the control program to obtain a variable K as the target data.

Development support device 200 provides a development environment for the control program executed by each control unit 10 and setting related to operation of each control unit 10. Development support device 200 produces the control program and setting information with respect to each control unit 10 based on information input in the development environment. Development support device 200 outputs the control program and the setting information produced for each control unit 10 to control unit 10.

Furthermore, development support device 200 registers data (hereinafter referred to as "registration data") related to the service corresponding to each control unit 10 in server 300 such that the service providing the target data to the observer is executed by server 300.

Registration data 31 is data in which attribute information 31a (for example, a control device name) indicating an attribute of the service, access information 31b (for example, URL or an IP address) for accessing control unit 10, service identification information 31c (for example, a service name) identifying the service, an execution file 31d for executing the service, and a screen generation code 31e for generating a user interface (UI) screen corresponding to the service are associated with each other. Screen generation code 31e indicates a graphical user interface (GUI) and is produced in a format displayable by a web browser. Development support device 200 may register registration data related to a plurality of services for one control unit 10 in server 300.

Development support device 200 sets public data information to control unit 10 such that the target data can be collected from control unit 10 when server 300 executes the service. The public data information indicates the type of data that can be disclosed to an outside. In the example of FIG. 1, the public data information indicates the type "variable K" of the target data. Thus, control unit 10 can output variable K to server 300 when receiving a request of variable K from server 300.

Terminal 400 is used by a monitoring person who monitors the one or the plurality of control units 10, and provides the target data to the monitoring person. For example, terminal 400 is a personal computer (PC), a tablet, or a smartphone.

Terminal 400 includes a web browser. The monitoring person monitors the target data corresponding to desired control unit 10 using the web browser.

Server 300 provides the target data to terminal 400. Server 300 is a computer having a role that receives a request or an instruction from another computer (terminal 400 in the example of FIG. 1) on the network and returns information or a processing result. Server 300 may be a cloud server that is built on a cloud and provides information processing service through the Internet. The cloud server is typically a virtual server constructed on a cloud.

Server 300 stores registration data 31 registered by development support device 200. Server 300 includes a service module 32 executing the service. Service module 32 receives selection of a control unit to be targeted (hereinafter referred to as "target control unit") in the one or the plurality of control unit 10 and a service to be targeted (hereinafter referred to as "target service") in the one or the plurality of services corresponding to the target control unit from terminal 400.

Service module 32 transfers the UI screen indicated by screen generation code 31e corresponding to the target service of the target control unit from registration data 31 to terminal 400. Terminal 400 outputs a service execution request to server 300 in response to the input of the service start instruction on the UI screen.

When receiving the execution request, service module 32 reads execution file 31d corresponding to the target service of the target control unit, and executes processing according to execution file 31d. Specifically, service module 32 accesses the target control unit (control unit 10 in the example of FIG. 1) based on access information 31b about the target control unit, and collects the target data (variable K in the example of FIG. 1) from control unit 10. Service module 32 provides the UI screen, which is indicated by screen generation code 31e corresponding to the target service and includes the collected target data, to terminal 400.

Figure 2:
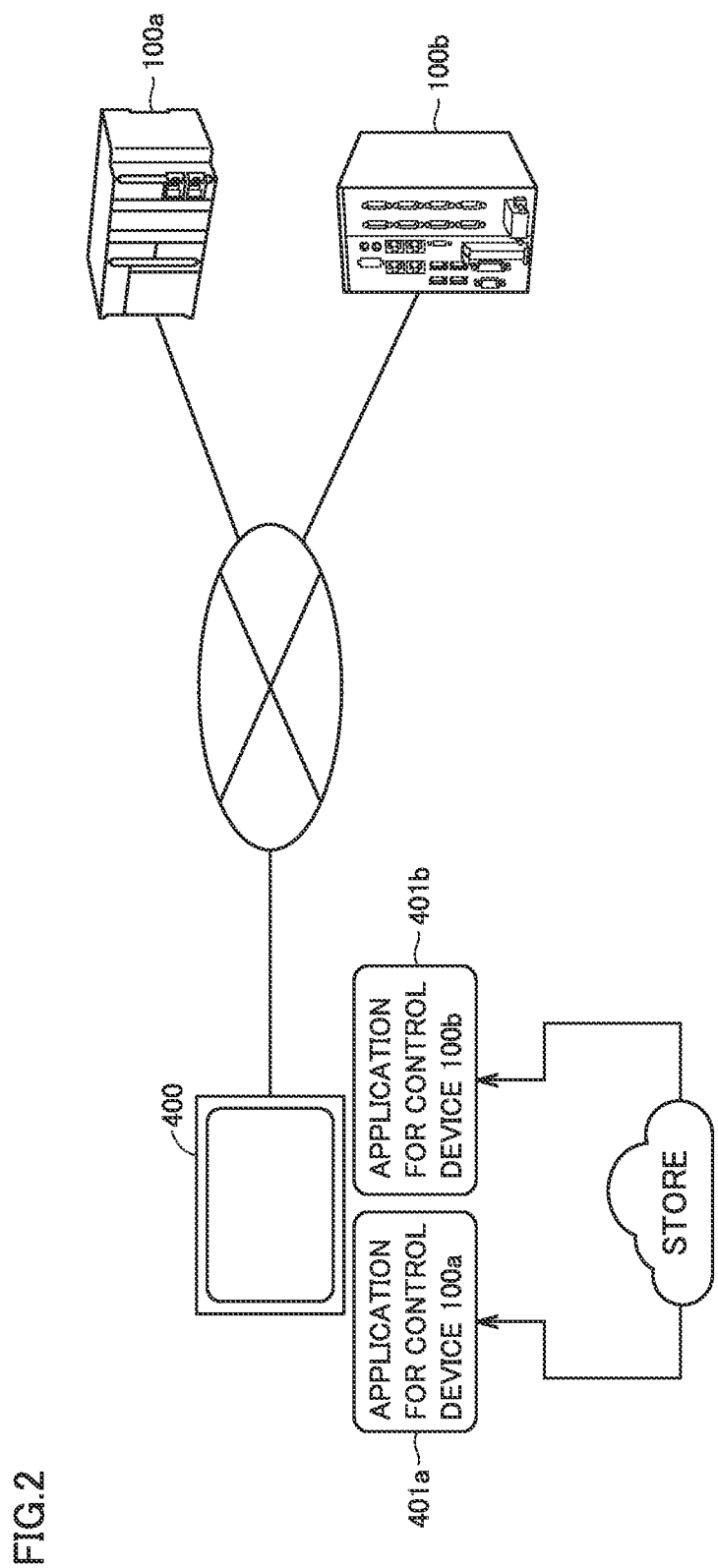
FIG. 2 is a view illustrating a configuration of an information providing system according to a reference form.

FIG. 2 is a view illustrating a configuration of an information providing system according to a reference form. In the example of FIG. 2, terminal 400 accesses control devices 100a, 100b through a network such as a virtual private network (VPN), and acquires the target data. Control devices 100a, 100b execute the control program, thereby obtaining the target data. However, different protocols and commands are used for communication with control devices 100a, 100b depending on the type of the control device. For this reason, in terminal 400, applications 401a, 401b corresponding to the types of control devices 100a, 100b need to be installed from the store in advance. Each of applications 401a, 401b is an application communicating with a corresponding type of a control device and browsing the target data obtained by the control device executing the control program.

Furthermore, information (for example, IP address) for accessing control devices 100a, 100b needs to be set to applications 401a, 401b. For this reason, the monitoring person needs to previously check the IP addresses and the like of control devices 100a, 100b.

On the other hand, according to information providing system SYS of the embodiment, the monitoring person can easily check the target data obtained by the target control unit on, for example, the web browser by operating terminal 400 to access server 300 and requesting the target service of the target control unit. That is, the application for each control unit 10 (or control device 100) needs not to be previously installed in terminal 400. Furthermore, because the access to control unit 10 is performed from server 300, the monitoring person does not need to check information (for example, an IP address) accessing previously each control unit 10. As described above, according to information providing system SYS, the one or the plurality of control units 10 can be easily monitored.

§ 2 Specific Example

A specific example of the information providing system of the embodiment will be described.

A. Hardware Configuration Example of Control Device

Figure 3:
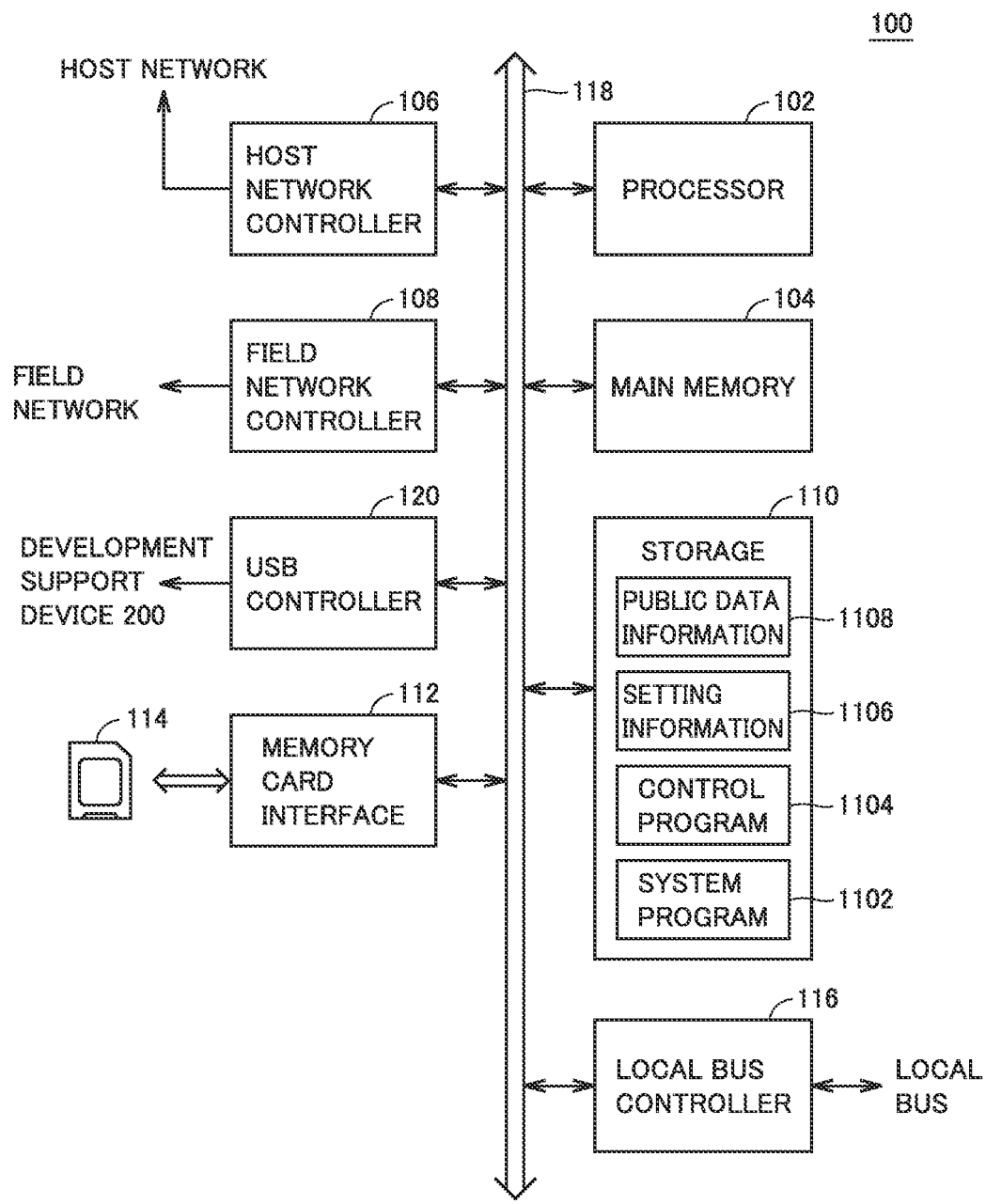
FIG. 3 is a schematic diagram illustrating a hardware configuration example of a control device constituting the information providing system in FIG. 1.

FIG. 3 is a schematic diagram illustrating a hardware configuration example of the control device constituting the information providing system in FIG. 1. As illustrated in FIG. 3, control device 100 includes a processor 102, a main memory 104, a storage 110, a host network controller 106, a field network controller 108, a universal serial bus (USB) controller 120, a memory card interface 112, and a local bus controller 116. These components are connected to each other through a processor bus 118.

Processor 102 mainly corresponds to an arithmetic processing unit that executes control arithmetic operation related to the control of the control target, and is constructed with a central processing unit (CPU), a graphics processing unit (GPU), and the like. Specifically, processor 102 reads a program (as an example, a system program 1102 and a control program 1104) stored in storage 110, develops the program in main memory 104, and executes the program, thereby implementing control arithmetic operation and various pieces of processing according to the control target.

Main memory 104 is constructed with a dynamic random access memory (DRAM), a static random access memory (SRAM), or the like. Storage 110 is constructed with a nonvolatile storage device such as a solid state drive (SSD) and a hard disk drive (HDD).

In addition to system program 1102 implementing a basic function, control program 1104 produced according to the control target is stored in storage 110. In addition, setting information 1106 setting a variable and the like is stored in storage 110. Furthermore, public data information 1108 indicating the type of data that can be published to server 300 is stored in storage 110. Control program 1104, setting information 1106, and public data information 1108 are stored in storage 110 by development support device 200.

Host network controller 106 exchanges data with an arbitrary information processing apparatus (for example, server 300) through a host network.

Field network controller 108 exchanges data with an arbitrary device such as the control target through a field network.

USB controller 120 exchanges data with development support device 200 and the like through USB connection.

Memory card interface 112 receives memory card 114 that is an example of a detachable recording medium. Memory card interface 112 can write data in memory card 114 and read various data (such as logs and trace data) from memory card 114.

Local bus controller 116 exchanges data with an arbitrary unit connected to control device 100 through a local bus.

Although the configuration example in which necessary functions are provided by processor 102 executing the program has been described in FIG. 3, some or all of these provided functions may be implemented using a dedicated hardware circuit (for example, an application specific integrated circuit (ASIC) and a field-programmable gate array (FPGA)). Alternatively, the main part of control device 100 may be implemented using hardware (for example, an industrial personal computer based on a general-purpose personal computer) according to a general-purpose architecture. In this case, a plurality of OSs (Operating Systems) having different uses may be executed in parallel using a virtualization technology, and the necessary application may be executed on each OS. Furthermore, a configuration in which functions such as a display device and a support device are integrated with control device 100 may be adopted.

B. Hardware Configuration Example of Development Support Device

Figure 4:
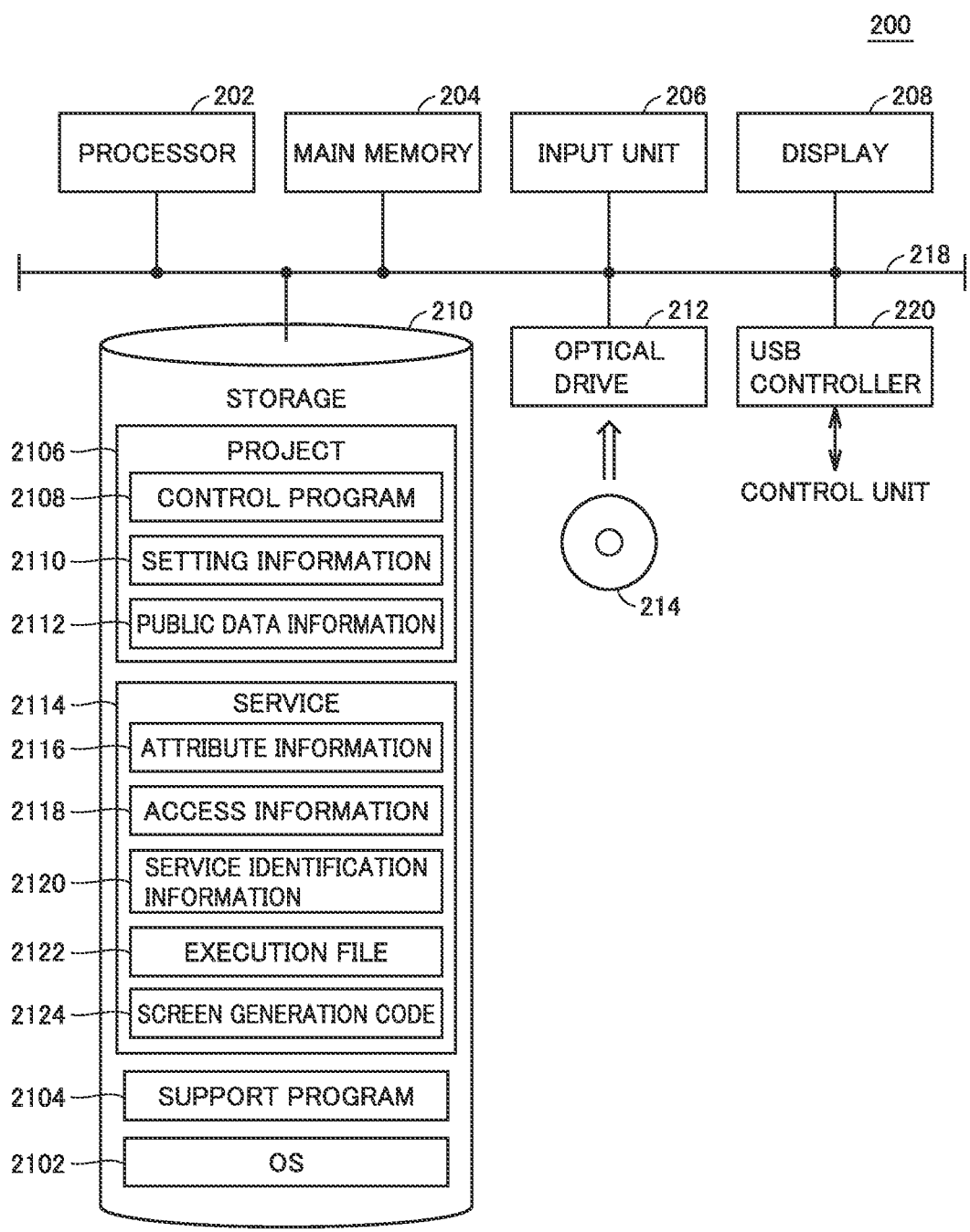
FIG. 4 is a schematic diagram illustrating a hardware configuration example of a development support device constituting the information providing system in FIG. 1.

FIG. 4 is a schematic diagram illustrating a hardware configuration example of the development support device constituting the information providing system in FIG. 1. For example, development support device 200 is implemented using hardware (for example, a general-purpose personal computer) according to a general-purpose architecture.

As illustrated in FIG. 4, development support device 200 includes a processor 202, a main memory 204, an input unit 206, a display 208, a storage 210, an optical drive 212, and a USB controller 220. These components are connected to each other through a processor bus 218.

Processor 202 is constructed with a CPU, a GPU, and the like, and reads a program (as an example, an OS 2102 and a support program 2104) stored in storage 210, develops the program in main memory 204, and executes the program, thereby implementing various pieces of processing.

Main memory 204 is constructed with a volatile storage device such as a DRAM or an SRAM. For example, storage 210 includes a non-volatile storage device such as an HDD or an SSD.

In addition to OS 2102 implementing the basic function, support program 2104 providing the function as development support device 200 is stored in storage 210. That is, support program 2104 is executed by a computer connected to information providing system SYS, thereby implementing development support device 200 of the embodiment.

Furthermore, storage 210 stores project data 2106 and service data 2114 produced by the user in a development environment provided by the execution of support program 2104.

In the embodiment, development support device 200 provides a development environment in which the program executed by each control unit 10 can be produced. Project data 2106 includes a control program 2108 generated by the development environment, setting information 2110, and public data information 2112. Control program 2108, setting information 2110, and public data information 2112 constituting project data 2106 are transmitted to control unit 10 and stored as the control program 1104, setting information 1106, and public data information 1108 (see FIG. 3), respectively.

Service data 2114 is generated by the development environment, and includes attribute information 2116, access information 2118, service identification information 2120, an execution file 2122, and a screen generation code 2124. Attribute information 2116, access information 2118, service identification information 2120, execution file 2122, and screen generation code 2124 are transmitted to server 300 and registered as attribute information 31*a*, access information 31*b*, service identification information 31*c*, execution file 31*d*, and screen generation code 31*e* (see FIG. 1) of registration data 31, respectively. Access information 2118 may be incorporated in execution file 2122.

Input unit 206 is constructed with a keyboard, a mouse, and the like, and receives a user operation. Display 208 displays a processing result and the like from processor 202. The display may be constructed integrally with development support device 200, or may be externally connected to development support device 200.

USB controller 220 exchanges data with control device 100 constituting control unit 10 through USB connection.

Development support device 200 includes optical drive 212, and a program stored in recording medium 214 (for example, an optical recording medium such as a digital versatile disc (DVD)) that non-transiently stores a computer-readable program is read and installed in storage 210 or the like.

Support program 2104 and the like executed by development support device 200 may be installed through computer-readable recording medium 214, or installed by being downloaded from the server device or the like on the network. Furthermore, the function provided by development support device 200 may be implemented using a part of the module provided by the OS.

Although the configuration example in which the required functions as development support device 200 are provided by processor 202 executing the program has been described in FIG. 4, some or all of these provided functions may be mounted using a dedicated hardware circuit (for example, ASIC or FPGA).

Development support device 200 may be removed from control device 100 constituting control unit 10 during the operation of information providing system SYS.

C. Hardware Configuration Example of Server

Figure 5:
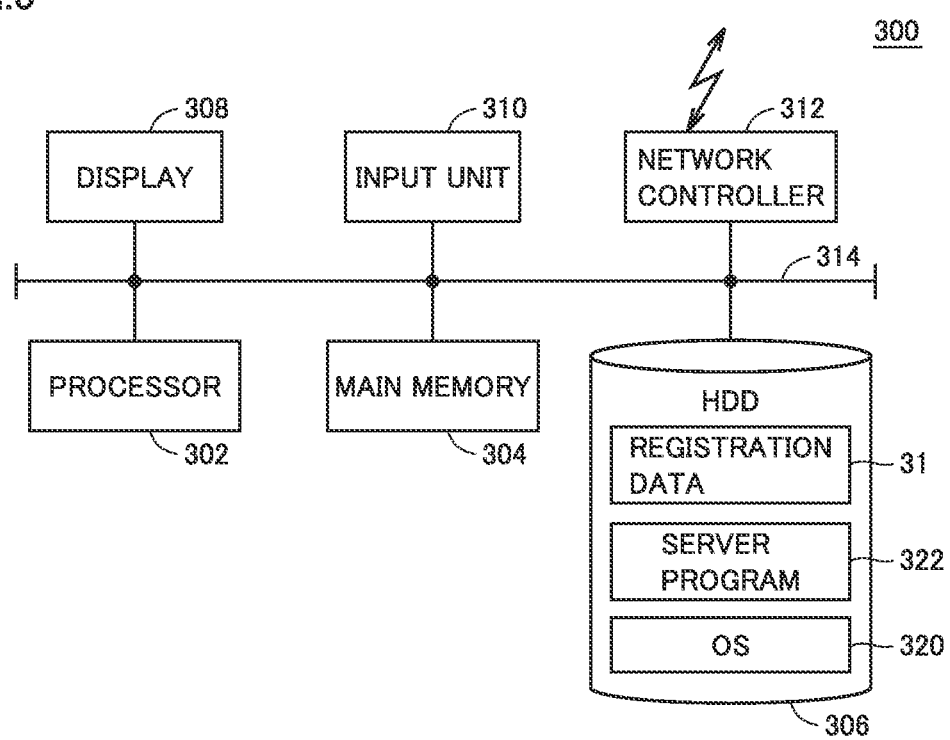
FIG. 5 is a schematic diagram illustrating a hardware configuration example of a server constituting the information providing system in FIG. 1.

FIG. 5 is a schematic diagram illustrating a hardware configuration example of the server constituting the information providing system in FIG. 1. Server 300 in the example of FIG. 5 includes a processor 302 such as a CPU or an MPU, a main memory 304, a hard disk (HDD) 306, a display 308, an input unit 310 such as a keyboard or a mouse, and a network controller 312 exchanging data with other devices. These components are communicably connected to one another through an internal bus 314.

Hard disk 306 holds an OS 320 providing an execution environment of a basic program in server 300 and a server program 322 implementing the service. These programs are read into main memory 304 and executed by processor 302.

Furthermore, hard disk 306 stores registration data 31 generated based on service data 2114 transmitted from development support device 200.

Figure 6:
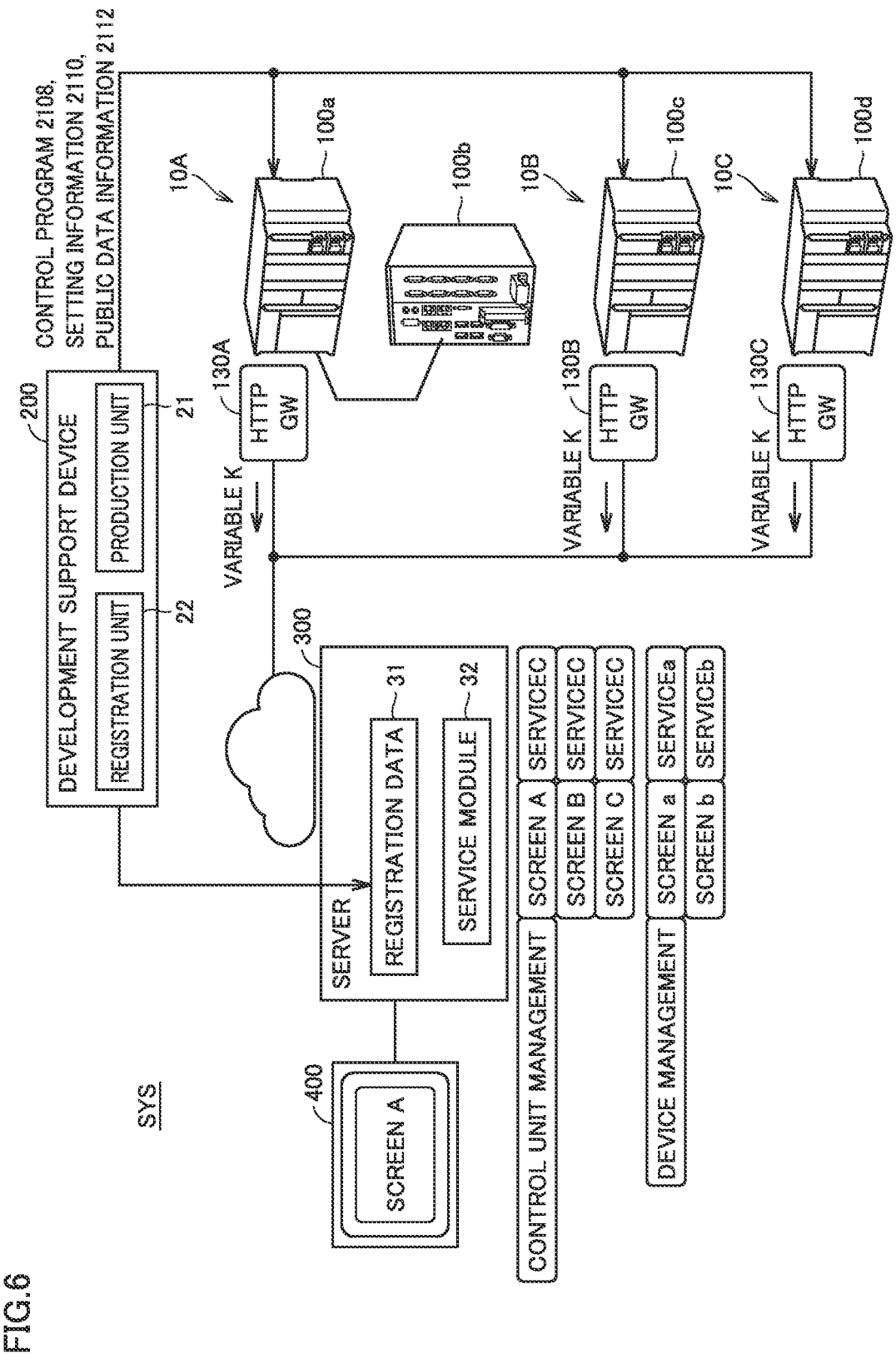
FIG. 6 is a schematic diagram illustrating a functional configuration example of the development support device and the server constituting the information providing system in FIG. 1.

D. Functional Configuration Example of Development Support Device and Server FIG. 6 is a schematic diagram illustrating a functional configuration example of the development support device and the server constituting the information providing system in FIG. 1. In the example of FIG. 6, information providing system SYS includes three control units 10A to 10C. Control unit 10A includes two control devices 100a, 100b. Control unit 10B includes one control device 100c. Control unit 10C includes one control device 100d. Control units 10A to 10C include gateways 130A to 130C connected to a network, respectively. For example, gateways 130A, 130B, 130C are incorporated in control devices 100a, 100c, 100d, respectively.

As illustrated in FIG. 6, development support device 200 includes a production unit 21 and a registration unit 22. Processor 202 in FIG. 4 executes support program 2104, thereby implementing production unit 21 and registration unit 22.

Production unit 21 provides a function such as input and editing for producing the source program of control program 2108 executed by the control unit for each of control units 10A to 10C. More specifically, production unit 21 provides a storage function and an editing function of the produced source program in addition to the function of producing the source program by operating input unit 206 (see FIG. 4) by a designer. Production unit 21 produces the source program using a change instruction selected from the instruction library according to the operation of the designer. Production unit 21 provides a function of compiling the produced source program to generate control program 2108 in a program format executable by the control unit.

Production unit 21 also produces setting information 2110 required for executing the control arithmetic operation according to control program 2108. Setting information 2110 includes assignment of a variable used for control program 2108.

Control program 2108 produced for control unit 10 including the plurality of control devices 100 includes a partial program corresponding to each of the plurality of control devices 100. In the example of FIG. 6, control program 2108 produced for control unit 10A includes a partial program corresponding to each of control devices 100a, 100b included in control unit 10A. Control device 100a executes a partial program corresponding to control device 100a in control program 2108. Similarly, control device 100b executes a partial program corresponding to control device 100b in control program 2108.

Registration unit 22 produces service data 2114 related to the service providing the target data to terminal 400 for each of control units 10A to 10C, and registers the produced service data 2114 in server 300. Furthermore, registration unit 22 produces public data information 2112 such that the target data can be output from control unit 10 to server 300 during the execution of each service, and registers produced public data information 2112 in control unit 10.

Registration unit 22 displays a screen supporting the production of service data 2114 on display 208 (see FIG. 4), and produces service data 2114 according to the input to input unit 206. Registration unit 22 also produces public data information 2112 using the screen.

Figure 7:
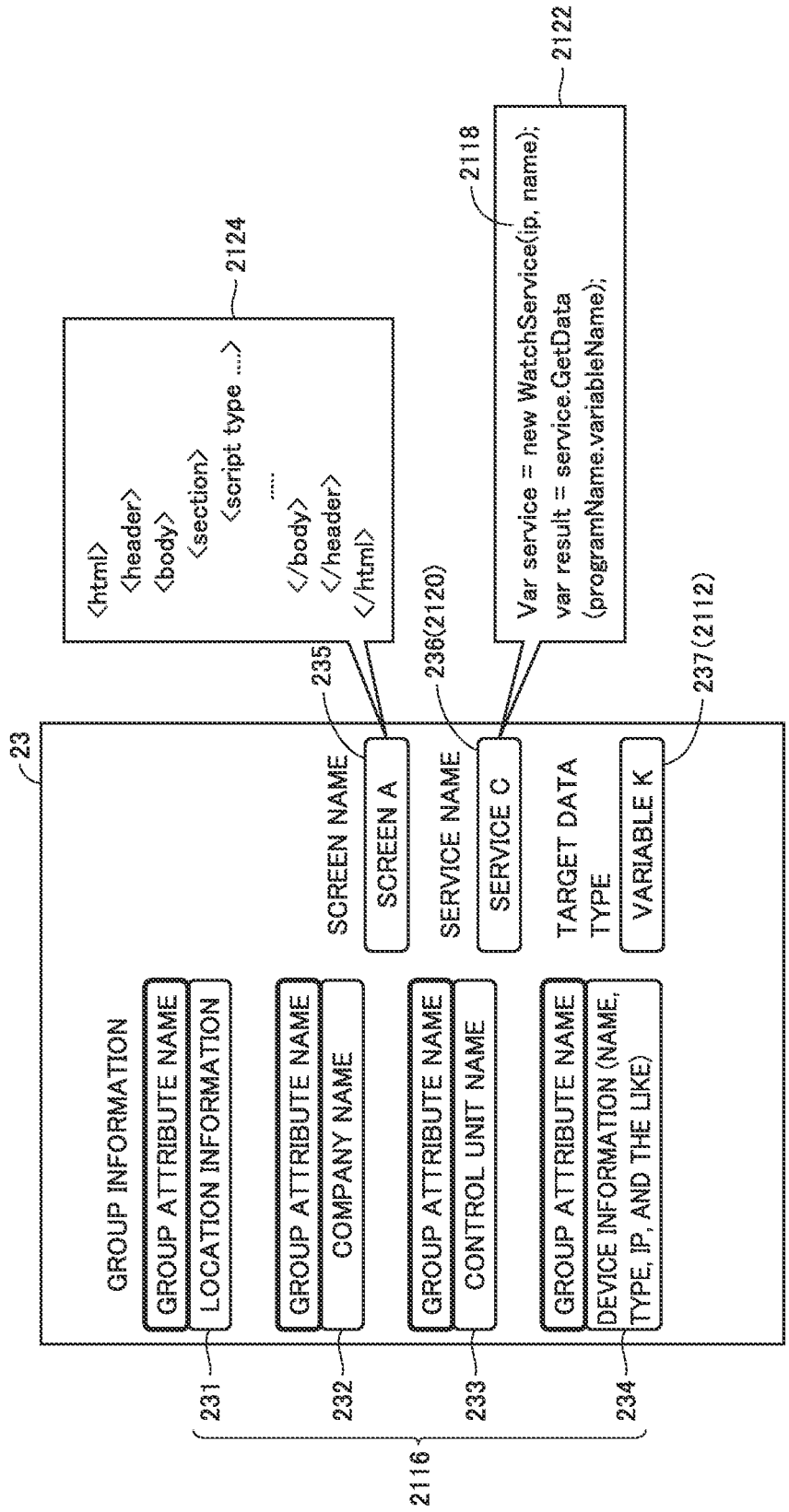
FIG. 7 is a view illustrating a screen example for supporting production of service data.

FIG. 7 is a view illustrating a screen example for supporting the production of the service data. A screen 23 in FIG. 7 is displayed on display 208 by registration unit 22. Screen 23 includes input fields 231 to 234 producing attribute information 2116 indicating the attribute of the service. Input field 231 is a field for inputting an installation position of control unit 10. Input field 232 is a field for inputting information (a company name in the example of FIG. 7) identifying an organization to which control unit 10 belongs. Input field 233 is a field for inputting the name of control unit 10. Input field 234 is a field for inputting information (a name, a type, an IP, and the like) of control device 100 included in control unit 10. Registration unit 22 produces attribute information 2116 according to the input to input fields 231 to 234. In the example of FIG. 7, attribute information 2116 includes the installation position of control unit 10, the name of control unit 10, the organization to which control unit 10 belongs, and the name, the type, the IP, and the like of the control device included in control unit 10. Attribute information 2116 may include the name of the control program executed to obtain the target data and the type of the target data.

Screen 23 further includes an input field 235 for inputting the name of the UI screen displayed on terminal 400 when the target data is provided to terminal 400. When the name of the UI screen is input to input field 235, registration unit 22 displays a window in order to produce screen generation code 2124 generating the UI screen. Registration unit 22 produces screen generation code 2124 according to the information input to the window. Screen generation code 2124 indicates layout information of the screen, and is produced using, for example, HTML5 or CSS.

Screen 23 further includes an input field 236 inputting the name of the service. Registration unit 22 produces service identification information 2120 indicating the name input to input field 236. In addition, when the name of the service is input to input field 236, registration unit 22 displays a window in order to produce execution file 2122 executing the service. Registration unit 22 produces execution file 2122 according to the information input to the window. Execution file 2122 is described in an execution form (for example, JAVA (registered trademark) script) that can be executed by server 300.

In the example of FIG. 7, access information 2118 (for example, an IP address, a URL) for accessing control unit 10 is incorporated in execution file 2122.

Screen 23 further includes an input field 237 for inputting the type of the target data. Registration unit 22 produces public data information 2112 indicating the type input to input field 237.

Figure 8:
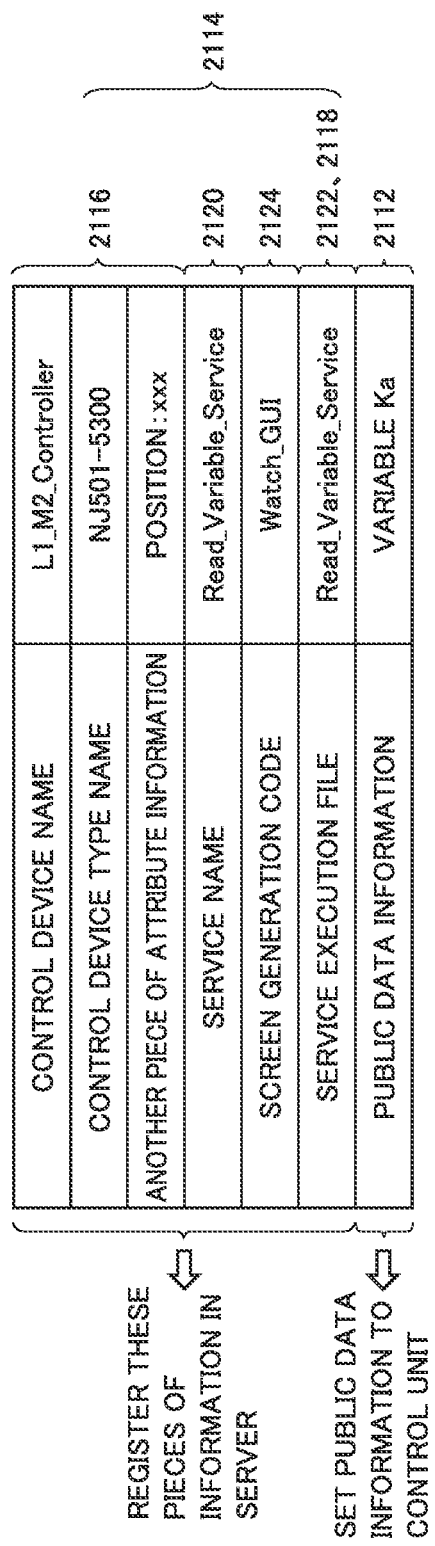
FIG. 8 is a view illustrating a list example of various pieces of information produced by a registration unit of the development support device.

FIG. 8 is a view illustrating a list example of various pieces of information produced by the registration unit of the development support device. Registration unit 22 generates various pieces of information in FIG. 8 according to the input to screen 23 in FIG. 7. Registration unit 22 registers service data 2114 including produced attribute information 2116, service identification information 2120, screen generation code 2124, and execution file 2122 (including access information 2118) in server 300. Furthermore, registration unit 22 sets produced public data information 2112 to the corresponding control unit.

Registration unit 22 may produce a plurality of pieces of service data 2114 for one control unit 10. For example, for control unit 10A including two control devices 100a, 100b, registration unit 22 may produce first service data corresponding to a set of control devices 100a, 100b (entire control unit 10A) and second service data corresponding to each of control devices 100a, 100b. Alternatively, registration unit 22 may produce at least one of the first service data and the two pieces of second service data.

For example, the first service data relates to service that provides the target data obtained by control unit 10A executing the entire control program. For example, the second service data relates to service that provides the target data obtained by the corresponding control device executing a partial program corresponding to the control device in the control program.

Returning to FIG. 6, server 300 stores registration data 31 constructed with service data 2114 transmitted from development support device 200. For example, registration data 31 is illustrated in FIG. 1. However, when access information 31b is incorporated in execution file 31d, a column of access information 31b may be omitted in registration data 31 of FIG. 1.

As illustrated in FIG. 6, server 300 includes service module 32 executing the service.

Service module 32 publishes the list of registered service to terminal 400 based on registration data 31, and receives the selection of the target service of the target control unit to be executed. For example, when the service corresponding to each of control units 10A to 10C and the service corresponding to each of control devices 100a, 100b included in control unit 10A are registered in registration data 31, the service to be executed is selected from these five services. The service corresponding to each of control units 10A to 10C is selected when the monitoring is performed in units of control units. In the example of FIG. 6, service data 2114 having a screen name "screen A" and a service name "service C" is registered as the data related to the service corresponding to control unit 10A. In addition, the service corresponding to each of control devices 100a, 100b is selected when the monitoring is performed in units of control devices. In the example of FIG. 6, service data 2114 having a screen name "screen a" and a service name "service a" is registered as the data related to the service corresponding to control device 100a included in control unit 10A.

Figure 9:
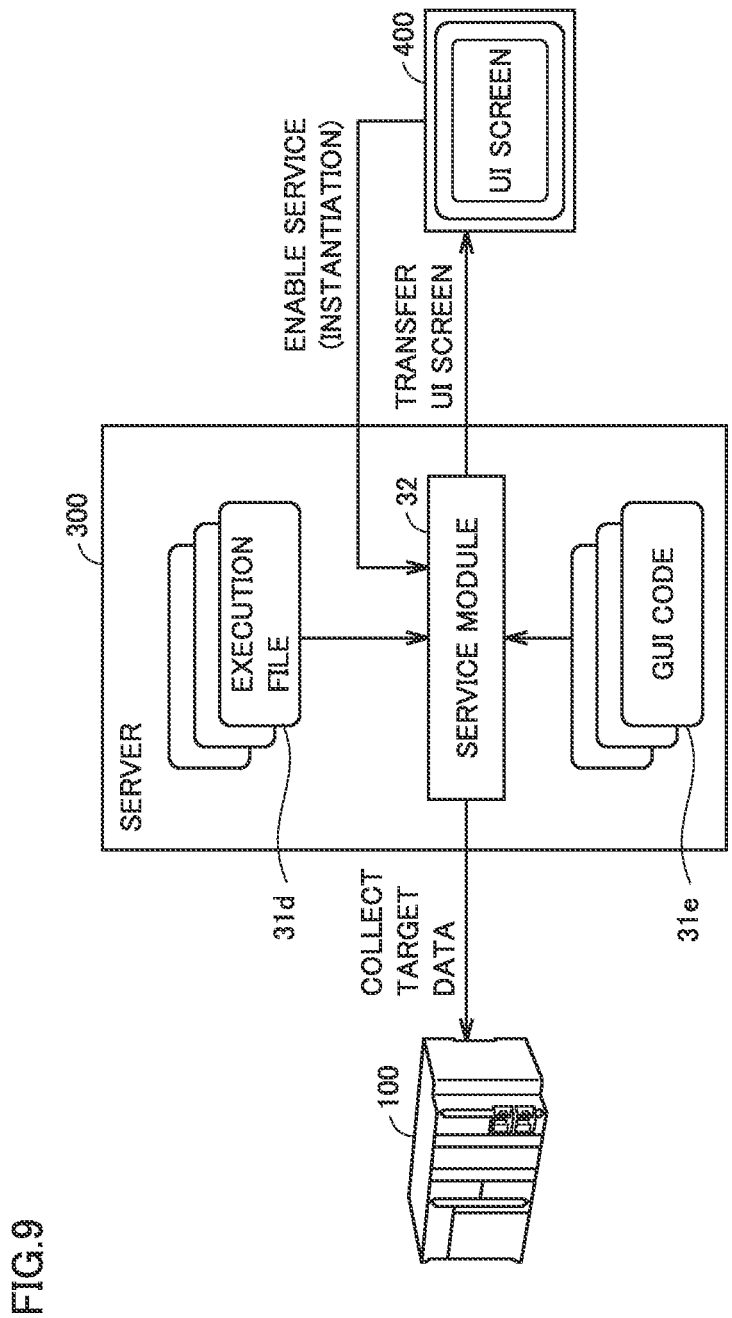
FIG. 9 is a view illustrating a processing content of a service module.

FIG. 9 is a view illustrating a processing content of the service module. As illustrated in FIG. 9, service module 32 receives an instruction to enable the target service of the target control unit from terminal 400. Service module 32 extracts screen generation code 31e corresponding to the target service of the target control unit from screen generation codes 31e included in registration data 31, and transfers the UI screen indicated by extracted screen generation code 31e to terminal 400. Thus, service module 32 can receive the operation on the UI screen.

Furthermore, service module 32 reads execution file 31d corresponding to the target service of the target control unit from execution files 31d included in registration data 31. Thus, the target service is enabled (instantiated) in server 300. Service module 32 executes the target service in response to an operation on the UI screen. Specifically, service module 32 accesses the target control unit according to access information 31b corresponding to the target control unit (or access information 31b incorporated in execution file 31d), and collects the target data. Service module 32 transfers the UI screen, which is indicated by screen generation code 31e corresponding to the target service and includes the collected target data, to terminal 400. Thus, the UI screen including the target data is displayed on terminal 400, and the monitoring person can check the target data.

E. Flow of Processing of Information Providing System

Figure 10:
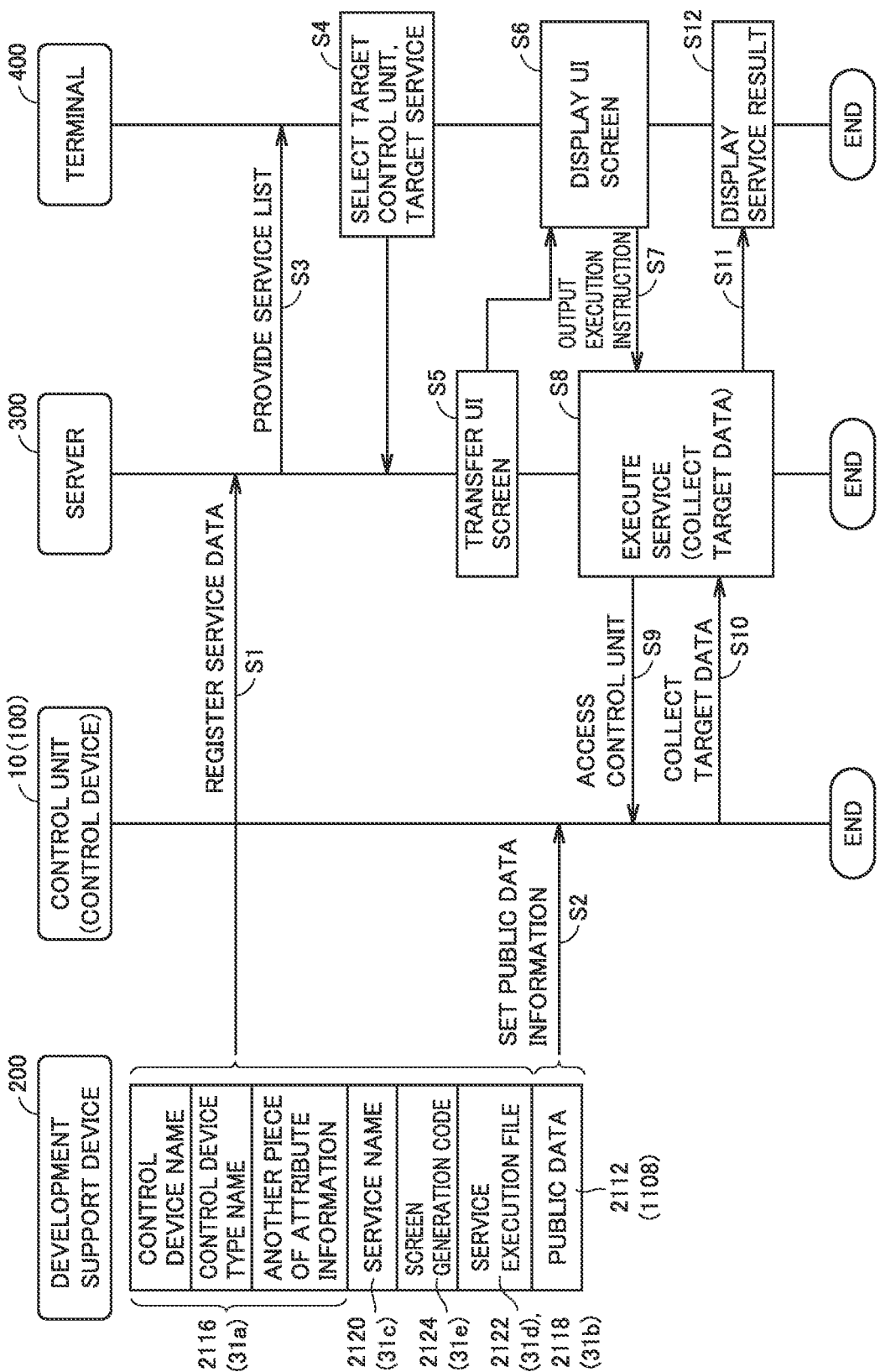
FIG. 10 is a timing chart illustrating an overall flow of information providing processing in the information providing system.

FIG. 10 is a timing chart illustrating an overall flow of information providing processing in the information providing system. First, development support device 200 registers service data including attribute information 2116, service identification information 2120, execution file 2122 (including access information 2118), and screen generation code 2124 of control unit 10 in server 300 (step S1).

Subsequently, development support device 200 sets public data information 2112 indicating the type of the target data that can be published to server 300 to control unit 10 (step S2).

Server 300 provides the list of attribute information 31a and service identification information 31c that are included in the registered service data to terminal 400 (step S3).

Terminal 400 displays the list, and receives the selection of the target control unit and the target service from the monitoring person (step S4).

Server 300 transfers the UI screen indicated by screen generation code 31e corresponding to the selected target service of the target control unit to terminal 400 (step S5). At this point, server 300 may access terminal 400 using access information 31b corresponding to the target control unit.

Terminal 400 displays the UI screen and receives the operation to the UT screen (step S6). Terminal 400 outputs an instruction corresponding to the operation to the UT screen to server 300 (step S7).

Server 300 executes the target service according to execution file 31d corresponding to the target service of the target control unit (step S8). For example, server 300 accesses control unit 10 (control device 100) (step S9), and collects the target data from control unit 10 (control device 100) (step S10).

Server 300 transfers the UI screen including the collected target data to terminal 400 (step S11). Terminal 400 displays the target data that is a service result (step S12). Thus, the monitoring person can easily check the target data using terminal 400.

F. Flow of Processing of Development Support Device

Figure 11:
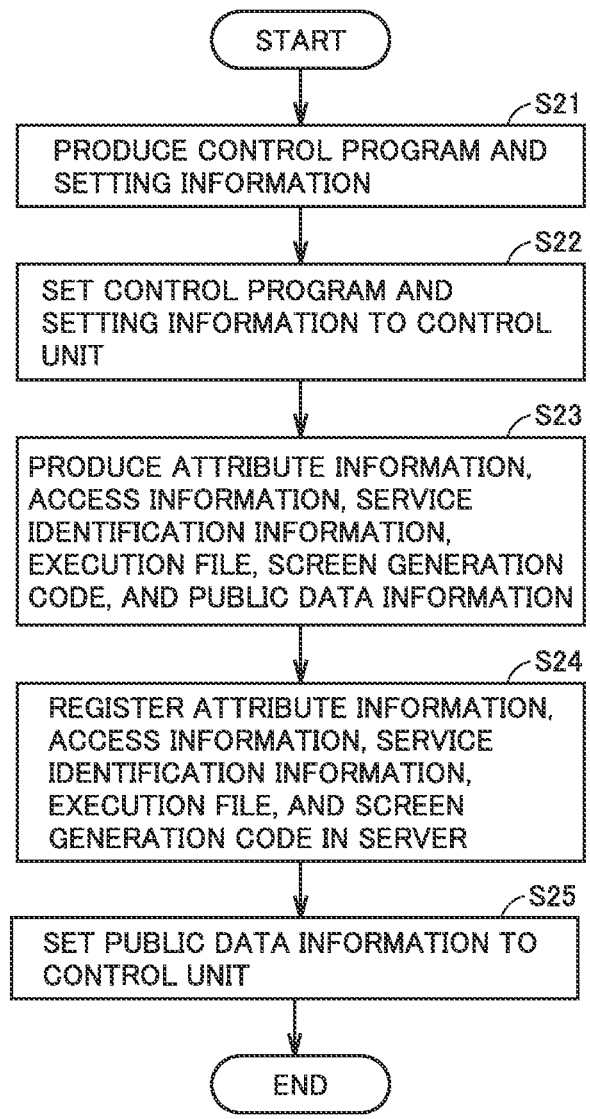
FIG. 11 is a flowchart illustrating an example of a processing flow of the development support device.

FIG. 11 is a flowchart illustrating an example of a processing flow of the development support device. Processor 202 provides the development environment, and produces control program 2108 and setting information 2110 according to the user input (step S21).

Processor 202 sets produced control program 2108 and setting information 2110 to corresponding control unit 10 (step S22).

Processor 202 provides the development environment, and produces attribute information 2116, access information 2118, service identification information 2120, execution file 2122, screen generation code 2124, and public data information 2112 according to the user input (step S23).

Processor 202 registers produced attribute information 2116, access information 2118, service identification information 2120, execution file 2122, and screen generation code 2124 in server 300 in association with each other (step S24). Furthermore, processor 202 sets produced public data information 2112 in corresponding control unit 10 (step S25).

G. Flow of Publishing Processing of Service List by Server

Figure 12:
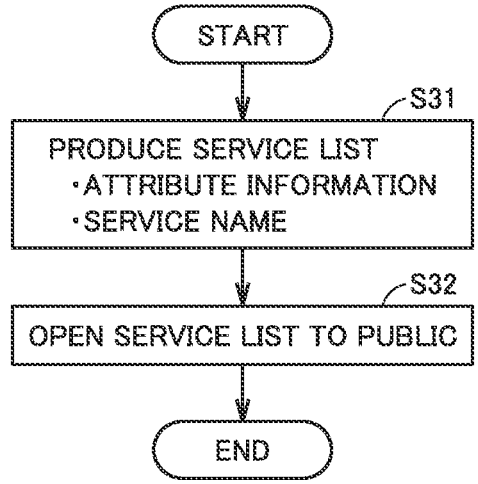
FIG. 12 is a flowchart illustrating an example of a publishing processing flow of a service list by the server.

FIG. 12 is a flowchart illustrating an example of a publishing processing flow of a service list by the server. Processor 302 produces the list of service providable to the accessing monitoring person from registration data 31 (step S31). For example, each piece of information included in registration data 31 is previously associated with an account of the monitoring person who can access the information, and processor 302 may produce the service list by extracting information corresponding to the account of the monitoring person from registration data 31. The service list includes at least attribute information 31a and service identification information 31c. The service list may include access information 31b and screen generation code 31e (or the name of the UI screen).

Furthermore, processor 302 may narrow down the services included in the list based on attribute information 31a. Specifically, processor 302 may extract the service corresponding to the attribute information indicating the attribute designated by terminal 400 from among the services registered in registration data 31, and output the extracted service list to terminal 400.

Figure 13:
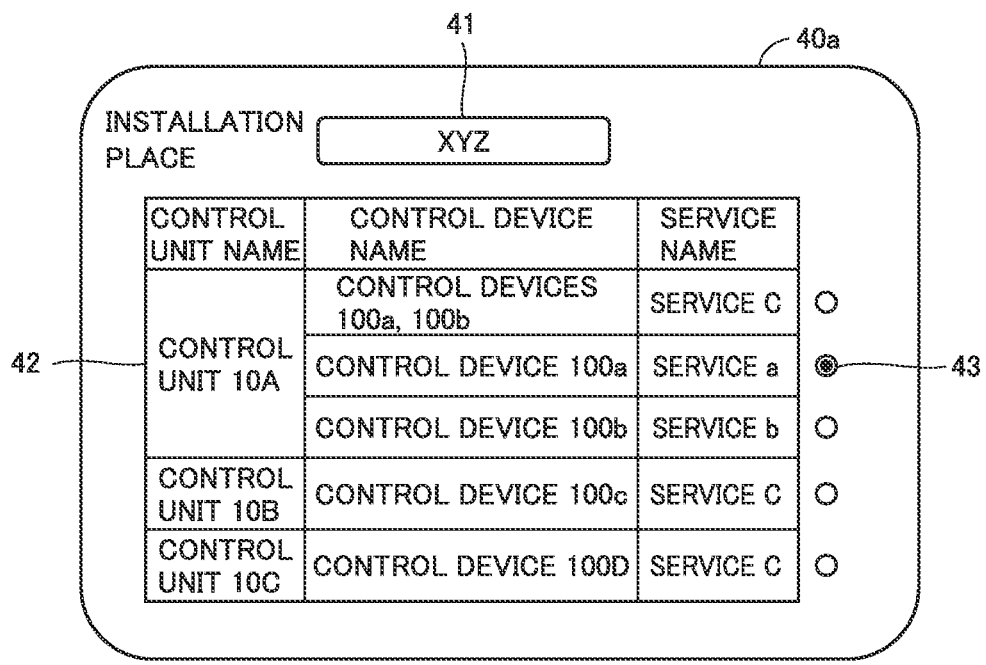
FIG. 13 is a view illustrating an example of a screen including the service list.

Processor 302 publishes the produced service list to terminal 400 (step S32). FIG. 13 is a view illustrating an example of the screen including the service list. FIG. 13 illustrates a screen 40a on which the services can be narrowed down based on an installation place of control unit 10. Screen 40a includes an input field 41 for inputting the installation place of control unit 10. The monitoring person may select the desired installation place from a plurality of installation places and input the selected installation place to input field 41. Thus, server 300 can produce service list 42 by extracting information corresponding to the account of the monitoring person and corresponding to the input installation place from registration data 31.

H. Service Provision Processing Flow

Figure 14:
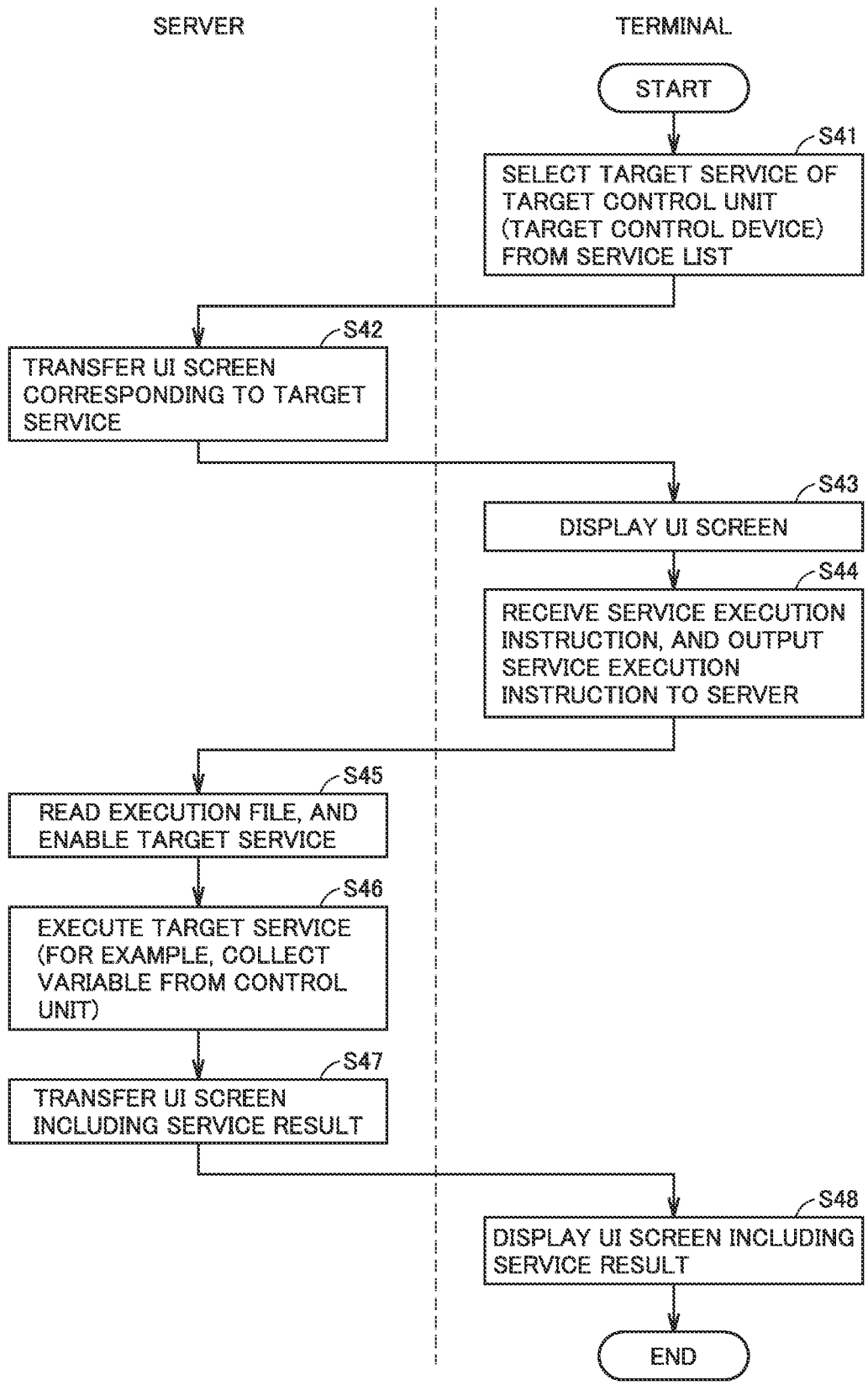
FIG. 14 is a flowchart illustrating an example of service providing processing flow.

FIG. 14 is a flowchart illustrating an example of a service providing processing flow. For example, terminal 400 receives the selection of the target service of the target control unit from the monitoring person on screen 40a in FIG. 13 (step S41). In the example of FIG. 13, the monitoring person selects the target service of the target control unit by operating radio button 43.

Processor 302 of server 300 transfers the UI screen indicated by screen generation code 31e corresponding to the selected target service of the target control unit to terminal 400 (step S42). Terminal 400 displays the UI screen transferred from server 300 (step S43).

Figure 15:
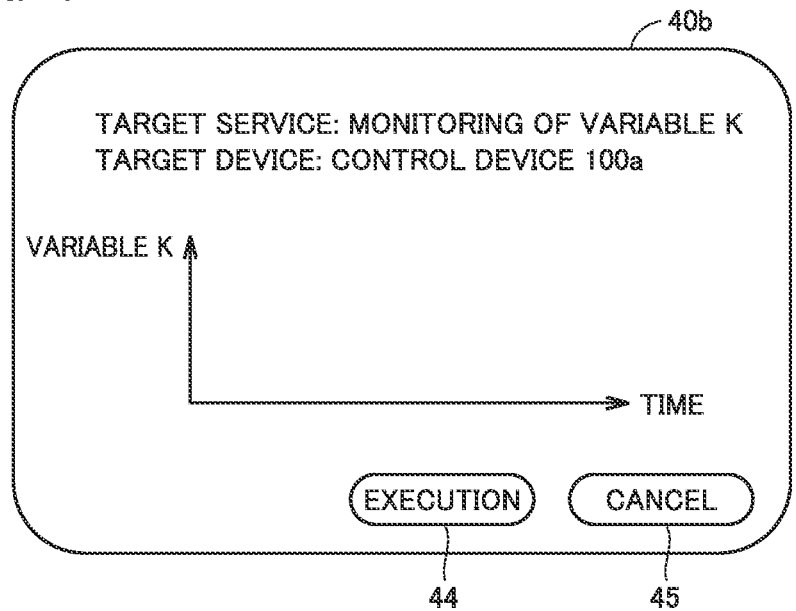
FIG. 15 is a view illustrating an example of a UI screen displayed on a terminal in step S43 of FIG. 14.

FIG. 15 is a view illustrating an example of the UI screen displayed on the terminal in step S43 of FIG. 14. FIG. 15 illustrates UI screen 40b corresponding to the service that provides "variable K" obtained by control device 100a executing the partial program corresponding to control device 100a as the target data. UI screen 40b includes an execution start button 44 and a cancel button 45.

Returning to FIG. 14, terminal 400 receives the instruction to execute the target service, and outputs the execution instruction to server 300 (step S44). For example, terminal 400 accepts the instruction to execute the target service according to the click of execution start button 44 on UI screen 40b in FIG. 15.

Processor 302 of server 300 reads execution file 31d corresponding to the target service of the target control unit to enable (instantiate) the target service (step S45). Processor 302 executes the target service (step S46). For example, processor 302 collects variable K as the target data from control device 100a. Processor 302 transfers the UI screen including the target data that is the result of the target service to terminal 400 (step S47). Terminal 400 displays the UI screen including the service result transferred from server 300 (step S48).

Figure 16:
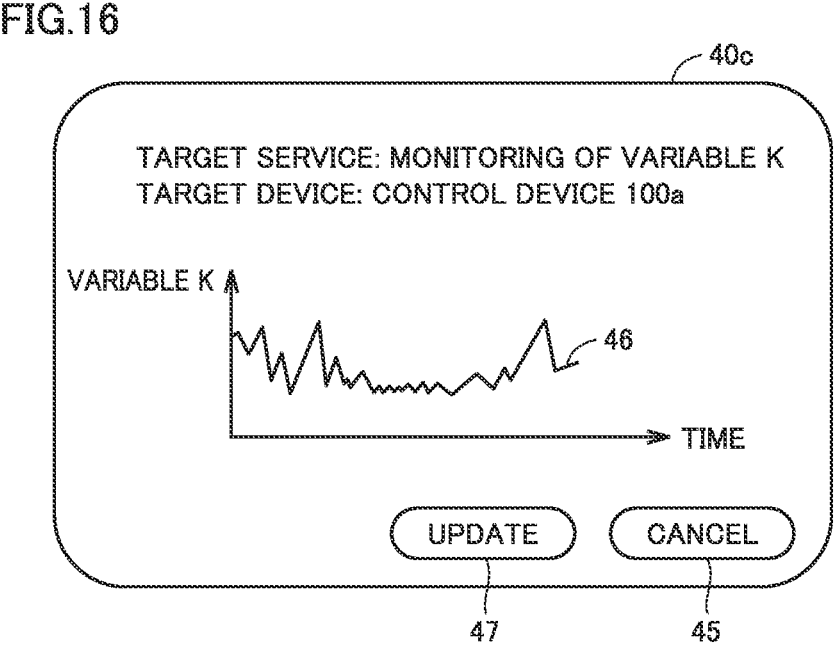
FIG. 16 is a view illustrating an example of the UI screen displayed on the terminal in step S48 of FIG. 14.

FIG. 16 is a view illustrating an example of the UI screen displayed on the terminal in step S48 of FIG. 14. A screen 40c in FIG. 16 includes a graph 46 illustrating a temporal change of the variable K that is of the target data. In addition, UI screen 40c includes an update button 47. When update button 47 is clicked, steps S45 to S48 in FIG. 14 are repeated, and graph 46 is updated based on the latest target data.

When cancel button 45 is clicked, server 300 ends the service provision processing.

I. Modification

In the above description, development support device 200 registers registration data 31 in server 300. However, when control device 100 previously stores the attribute information (such as the name of the device) and the access information (such as the IP address) corresponding to control device 100, registration data 31 may be registered in server 300 by development support device 200 and control device 100. For example, the case where the same service (for example, the service that provides variable K) is registered in server 300 for each type of control device 100 will be described below.

FIG. 17 is a flowchart illustrating an example of registration processing of registration data according to a modification. Processor 202 of development support device 200 registers service identification information 2120 identifying the service corresponding to the type of control device 100, and execution file 2122 and screen generation code 2124 corresponding to the service in server 300 in association with each other (step S51).

Furthermore, development support device 200 sets service identification information 2120 and URL of server 300 to control device 100 to which the control program is set (step S52).

Control device 100 accesses server 300 based on the URL of server 300 (step S53). Then, control device 100 registers the previously-stored attribute information and access information in server 300 in association with the same service identification information 2120 as service identification information 31c received from development support device 200 (step S54). The processing for registering registration data 31 ends after step S54. Consequently, the attribute information and the access information are automatically registered in server 300 from control device 100.

J. Action and Effect

As described above, information providing system SYS includes the one or the plurality of control units 10 controlling the control target, server 300 capable of communicating with terminal 400 and control unit 10, and development support device 200 supporting the development of control unit 10. Development support device 200 includes production unit 21 and registration unit 22. Production unit 21 produces control program 210S executed by control unit 10 for each control unit 10, and outputs control program 210S to the control unit. For each control unit 10, registration unit 22 registers the service (specifically, execution file 2122) corresponding to control unit 10 and the screen generation code 2124 generating the UI screen corresponding to the service in server 300. Server 300 includes service module 32 providing the target service of the target control unit requested from terminal 400 in the plurality of services registered by registration unit 22. Service module 32 accesses the target control unit and collects the target data obtained by the target control unit executing control program 1104. Service module 32 provides the UI screen, which is indicated by screen generation code 31*e* corresponding to the target service and includes the target data, to terminal 400.

According to the above configuration, the monitoring person can easily check the target data obtained by the target control unit, for example, on the web browser by operating terminal 400 to access server 300 and selecting the target service of the target control unit. That is, the application for each control unit 10 needs to be previously installed in terminal 400. Furthermore, because the access to control unit 10 is performed from server 300, the monitoring person does not need to check information (for example, an IP address) accessing previously each control unit 10. In this manner, the one or the plurality of control units 10 can be easily monitored.

At least one control unit 10 (control unit 10A in the example of FIG. 6) of the one or the plurality of control units 10 may include the plurality of control devices 100*a*, 100*b*. Control program 1104 for control unit 10A includes a partial program corresponding to each of control devices 100*a*, 100*b*. Registration unit 22 registers at least one of a first service corresponding to a set of control devices 100*a*, 100*b* and two second services corresponding to control devices 100*a*, 100*b* in server 300 as the service corresponding to control unit 10A.

According to the above configuration, any one of the first service, the second service corresponding to control device 100*a*, and the second service corresponding to control device 100*b* may be registered according to the target data to be monitored. When all these services are registered in server 300, the monitoring person can monitor entire control unit 10A using the first service. Furthermore, the monitoring person can monitor the target data in units of control devices using the second service corresponding to each of control devices 100*a*, 100*b*.

The target data obtained by the execution of the second service is obtained by the control device corresponding to the second service executing the partial program corresponding to the control device in control program 1104.

Registration unit 22 registers the attribute information about the service in server 300 in association with the service. Service module 32 extracts the service corresponding to attribute information indicating the attribute designated by terminal 400 from the plurality of services, and outputs the list of the extracted services to terminal 400. Service module 32 may specify the service designated from terminal 400 in the list as the target service. Thus, the monitoring person can easily select the desired service by designating the attribute of the service.

The attribute information preferably indicates at least one of the installation position of corresponding control unit 10 in the one or the plurality of control units 10, the type of corresponding control unit 10, the organization to which corresponding control unit 10 belongs, the name of control device 100 included in corresponding control unit 10, the name of control program 1104, and the type of the target data.

Terminal 400 includes a web browser. Service module 32 provides the UI screen to terminal 400 based on an instruction from the web browser. Thus, the monitoring person can easily monitor the target data using a general-purpose web browser.

K. Appendix

As described above, the embodiment and the modification include the following disclosure.
(Configuration 1)
An information providing system (SYS) including:
one or a plurality of control units (10) configured to control a control target;
a server (300) capable of communicating with a terminal (400) and the one or the plurality of control units (10); and
a development support device (200) configured to support development of the one or the plurality of control units (10),
wherein the development support device (200) includes:
a production unit (21) configured to produce a control program to be executed by the control unit (10) for each of the one or the plurality of control units (10), and output the control program to the control unit (10); and
a registration unit (22) configured to register a service corresponding to the control unit (10) and a screen generation code generating a UI screen corresponding to the service in the server for each of the one or the plurality of control units (10),
the server (300) includes a service module (32) configured to provide a target service of a target control unit requested from the terminal (400) in a plurality of services registered by the registration unit (22),
the service module (32) is configured to:
access the target control unit to collect target data obtained by the target control unit executing the control program; and
provide a UI screen, which is indicated by the screen generation code corresponding to the target service and includes the target data, to the terminal (400).
(Configuration 2)
The information providing system (SYS) according to the configuration 1, wherein
at least one control unit (10A) of the one or the plurality of control units (10) includes a plurality of control devices (100*a*, 100*b*), the control program for the at least one control unit (10A) includes a partial program corresponding to each of the plurality of control devices (100*a*, 100*b*), and
the registration unit (22) registers at least one of a first service corresponding to a set of the plurality of control devices (100*a*, 100*b*) and a plurality of second services corresponding to the plurality of control devices (100*a*, 100*b*) in the server as a service corresponding to the at least one control unit (10A).
(Configuration 3)
The information providing system (SYS) according to the configuration 2, wherein the registration unit (22) is configured to register at least one second service of the plurality of second services in the server, and the target data is obtained by the control device (100a, 100b) that corresponds to the at least one second service and executes the partial program.

(Configuration 4)

The information providing system (SYS) according to any one of the configurations 1 to 3, wherein the registration unit (22) is configured to register attribute information about the service in the server in association with the service, the service module (32) is configured to:

extract a service corresponding to the attribute information indicating an attribute designated by the terminal from the plurality of services;

output a list of extracted services to the terminal (400); and specify a service designated by the terminal (400) in the list as the target service.

(Configuration 5)

The information providing system (SYS) according to the configuration 4, wherein the attribute information indicates at least one of an installation position of a corresponding control unit in the one or the plurality of control units (10), a type of the corresponding control unit, an organization to which the corresponding control unit belongs, a name of a control device (100) included in the corresponding control unit, a name of the control program, and a type of the target data.

(Configuration 6)

The information providing system (SYS) according to any one of the configurations 1 to 5, wherein the terminal (400) includes a web browser, and the service module (32) is configured to provide the UI screen to the terminal (400) based on an instruction from the web browser.

(Configuration 7)

A server (300) included in the information providing system (SYS) according to any one of the configurations 1 to 6, the server including the service module (32).

(Configuration 8)

An information providing method in a system (SYS) including one or a plurality of control units (10) configured to control a control target and a server (300) capable of communicating with a terminal (400) and the one or the plurality of control units (10), the information providing method comprising:

producing a control program to be executed by the control unit for each of the one or the plurality of control units (10), and outputting the produced control program to the control unit;

registering a service corresponding to the control unit and a screen generation code generating a UI screen corresponding to the service in the server (300) for each of the one or the plurality of control units (10); and providing a target service of a target control unit requested from the terminal in a plurality of services registered by the server, wherein the providing includes:

accessing the target control unit to collect target data obtained by the target control unit executing the control program; and causing the terminal to display the UI screen that is indicated by the screen generation code corresponding to the target service and includes the target data.

Although the embodiment of the present invention have been described, it should be considered that the disclosed embodiment is an example in all respects and not restrictive. The scope of the present invention is indicated by the claims, and it is intended that all modifications within the meaning and scope of the claims are included in the present invention.

REFERENCE SIGNS LIST 10, 10A, 10B, 10C: control unit, 21: production unit, 22: registration unit, 23, 40a, 40b, 40c: screen, 31: registration data, 31a, 2116: attribute information, 31b, 2118: access information, 31c, 2120: service identification information, 31d, 2122: execution file, 31e, 2124: screen generation code, 32: service module, 41, 231 to 237: input field, 42: list, 43: radio button, 44: execution start button, 45: cancel button, 46: graph, 47: update button, 100, 100a to 100d: control device, 102, 202, 302: processor, 104, 204, 304: main memory, 106: host network controller, 108: field network controller, 110, 210: storage, 112: memory card interface, 114: memory card, 116: local bus controller, 118, 218: processor bus, 120, 220: USB controller, 130A to 130C: gateway, 200: development support device, 206, 310: input unit, 208, 308: display, 212: optical drive, 214: recording medium, 300: server, 306: hard disk, 312: network controller, 314: internal bus, 322: server program, 400: terminal, 401a, 401b: application, 1102: system program, 1104, 2108: control program, 1106, 2110: setting information, 1108, 2112: public data information, 2104: support program, 2106: project data, 2114: service data, SYS: information providing system.

The invention claimed is:

1. An information providing system comprising:

one or more controllers, each of which-executes a control program;

a server capable of communicating with a terminal and the one or more controllers; and a development support device, wherein the development support device includes:

a first processor; and a first memory storing first instructions that, when executed by the first processor, cause the first processor to perform first operations, the first operations including:

producing the control program for each of the one or more controllers, and outputting the control program to the each of the one or more controllers;

registering, in the server, a service corresponding to each of the one or more controllers and a screen generation code generating a UI screen corresponding to the service, the service providing a variable that is obtained by a corresponding controller when executing the control program; and registering, in the server, attribute information about the service in association with the service, wherein the server includes:

a second processor; and a second memory storing second instructions that, when executed by the second processor, cause the second processor to perform second operations, the second operations including:

extracting services corresponding to the attribute information indicating an attribute designated by the terminal;

outputting a list of extracted services to the terminal;

specifying a service designated by the terminal in the list as a target service of a target controller, accessing the target controller to collect a target variable obtained by the target controller executing the control program; and providing a UI screen, which is indicated by the screen generation code corresponding to the target service and illustrates a temporal change of the target variable, to the terminal, and wherein the attribute information indicates at least one of an installation position of the corresponding controller in the one or more controllers and an organization to which the corresponding controller belongs.

2. The information providing system according to claim 1, wherein at least one controller of the one or more controllers includes a plurality of control devices, the control program for the at least one controller includes a partial program corresponding to each of the plurality of control devices, and the first operations include registering, in the server, at least one of a first service corresponding to a set of the plurality of control devices and a plurality of second services corresponding to the plurality of control devices as the service corresponding to the at least one controller.

3. The information providing system according to claim 2, wherein the first operations include registering at least one second service of the plurality of second services in the server, and the target variable is obtained by a control device of the plurality of control devices that corresponds to the at least one second service and executes the partial program.

4. The information providing system according to claim 1, wherein the attribute information further indicates at least one of a name of the corresponding controller, a name of a control device included in the corresponding controller, a type of the control device included in the corresponding controller, a name of the control program, and a type of the target variable.

5. The information providing system according to claim 1, wherein the terminal includes a web browser, and the second operations include providing the UI screen to the terminal based on an instruction from the web browser.

6. A server included in the information providing system according to claim 1, the server comprising the second processor and the second memory.

7. An information providing method in a system including one or more controllers each of which executes a control program and a server capable of communicating with a terminal and the one or more controllers, the information providing method comprising:

producing the control program for each of the one or more controllers, and outputting the control program to the each of the one or more controllers;

registering, in the server, a service corresponding to each of one or more controllers and a screen generation code generating a UI screen corresponding to the service, the service providing a variable that is obtained by a corresponding controller when executing the control program;

specifying a target service of a target controller in response to a request from the terminal;

accessing the target controller to collect a target variable obtained by the target controller executing the control program; and causing the terminal to display the UI screen that is indicated by the screen generation code corresponding to the target service and illustrates a temporal change of the target variable, wherein:

registering the service includes registering, in the server, attribute information about the service in association with the service, specifying the target service includes:

extracting services corresponding to the attribute information indicating an attribute designated by the terminal;

outputting a list of extracted services to the terminal; and specifying a service designated by the terminal in the list as the target service, and wherein the attribute information indicates at least one of an installation position of the corresponding controller in the one or more controllers and an organization to which the corresponding controller belongs.

8. The information providing method according to claim 7, wherein at least one controller of the one or more controllers includes a plurality of control devices, the control program for the at least one controller includes a partial program corresponding to each of the plurality of control devices, and registering the service includes registering, in the server, at least one of a first service corresponding to a set of the plurality of control devices and a plurality of second services corresponding to the plurality of control devices as the service corresponding to the at least one controller.

9. The information providing method according to claim 8, wherein registering the service includes registering at least one second service of the plurality of second services in the server, and the target variable is obtained by a control device of the plurality of control devices that corresponds to the at least one second service and executes the partial program.

10. The information providing method according to claim 7, wherein the attribute information further indicates at least one of a name of the corresponding controller, a name of a control device included in the corresponding controller, a type of the control device included in the corresponding controller, a name of the control program, and a type of the target variable.

11. The information providing method according to claim 7, wherein the terminal includes a web browser, and causing the terminal to display the UI screen includes providing the UI screen to the terminal based on an instruction from the web browser.

* * * * *